United States Patent Office 3,431,249
Patented Mar. 4, 1969

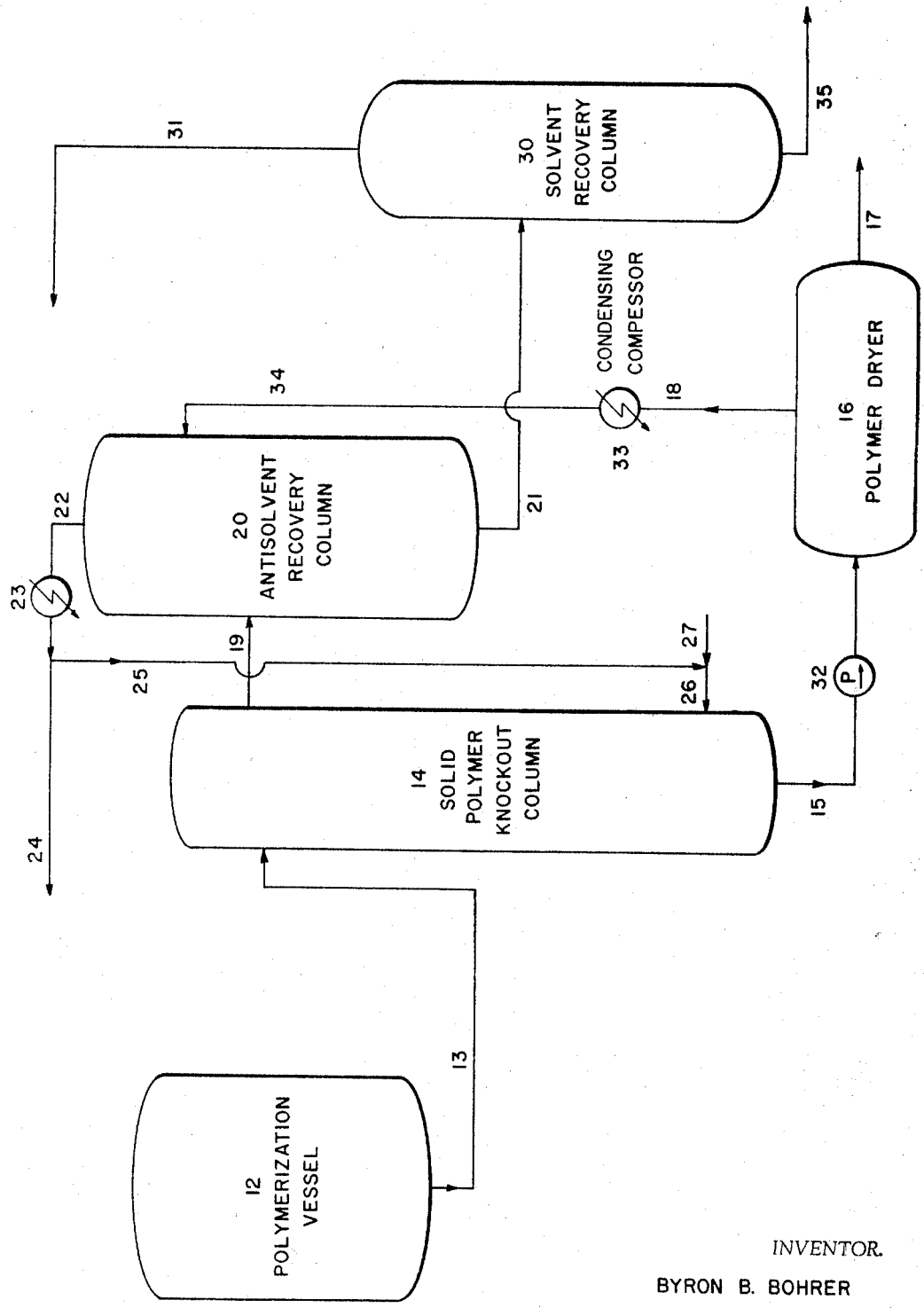

3,431,249
RECOVERY OF ALPHA-OLEFIN POLYMERS FROM SOLUTION
Byron B. Bohrer, Rosemont, and Stewart S. Kurtz, Jr., Merion, Pa., assignors, by mesne assignments, to Avisun Corporation, Philadelphia, Pa., a corporation of Delaware
Filed Apr. 20, 1966, Ser. No. 544,027
U.S. Cl. 260—93.7        6 Claims
Int. Cl. C08f 3/02

This invention relates to a novel process for the recovery of polymerization solvent soluble alpha-olefin polymers from solvent solutions thereof. The invention has particular utility in the recovery of ethylene-propylene copolymers from solutions thereof in the solvent used in the polymerization.

With the advent of low pressure polymerization of alpha-olefins, such as is provided by use of the Ziegler type catalyst systems, there has evolved a large number of new synthetic thermoplastic polymers. This breakthrough has also provided a means of synthesizing a new series of elastomeric alpha-olefin polymers which appear to have a great potential as a new synthetic rubber product. These new synthetic elastomers can be prepared by the use of catalysts generally known as coordination catalysts. These catalysts are made from components of two types: first, compounds of the transition heavy metals of Groups IV, V and VI beginning with titanium, vanadium, and chromium; and, second, organometallic compounds, hydrides and free metals of Groups I, II, and III. The compounds of the first type are preferably halides, oxyhalides, acetyl acetonates and alcoholates, the preferred metals being titanium and vanadium. The metals of the component of the second type are preferably lithium, sodium, magnesium, and aluminum and the organic portions are preferably alkyl radicals. In these organometallic compounds the valences of the metal may be partly satisfied by halogen or alkoxy, providing, of course, that at least one bond connects the metal with an organic radical. Mixtures of two or more compounds of the type described above can often be used to advantage.

More specific descriptions of some of the methods of producing alpha-olefin polymers usable in the process of the present invention are disclosed in U.S. Patents 2,933,480, 2,975,159, 3,000,866, 3,093,621, and 3,222,332.

In this method of synthesis, alpha-olefins are polymerized in solvent and the operating conditions are so controlled that the polymer remains in solution. In polymerizations of this type the catalysts must be used in strict absence of oxygen, water or other material with which they react. For this reason the solvents in which they are used are greatly limited. The preferred solvents for use with these methods are the aromatic, saturated aliphatic, and naphthenic hydrocarbons and certain non-reactive halogen compounds such as tetrachloroethylene and chlorobenzenes. These solvents conveniently serve as solvents for the polymerization of the olefins, the polymerization usually being carried out in a dilute suspension of the catalyst.

Recovery of the dissolved polymer product from the polymerization solvent solution thereof can be accomplished by several well known methods. For example, when low boiling solvents such as hexane or heptane are used as the polymerization medium, the polymer is often recovered from the cement by flash evaporation of the solvent. This flash evaporation preferably is combined with steam stripping.

Also it has been reported that processing conditions of alpha-olefin polymerization of the type hereinabove described are more favorable when aromatic or chlorinated hydrocarbons are used as polymerization solvents due to the higher solubility of the polymer in these solvents. But, due to the higher boiling points of these solvents, flash evaporation and steam stripping is considered commercially unattractive as a method of polymer recovery. It has also been discovered that the addition of large amounts of water or alcohol to polymer cements causes precipitation of the polymer, thereby facilitating easier recovery.

One of the less attractive facets of some of the presently known methods of recovering polymers as hereindescribed is that many of these procedures for recovering polymer from the polymerization solvent often require the introduction of large amounts of liquids into the processing stream, which liquids are known to be extremely poisonous to the catalysts used in the polymerization steps, e.g., water or alcohols.

When it is desired to reuse the polymerization solvent which is the procedure normally followed, extensive and costly solvent clean-up equipment and processing is required to prevent catalyst deactivation by the recycle solvent contaminants. Therefore, the use of presently known anti-solvent coagulation techniques for the recovery of alpha-olefin polymers from solution is often avoided. By the process of the present invention, the undesirable contamination of polymerization solvents with catalyst poisons is avoided.

It is an object of this invention to provide an improved process for recovery of alpha-olefin polymers from polymerization solvent solutions thereof.

It is a further object of this invention to provide a method of recovering alpha-olefin polymers from polymerization solvent solutions thereof during a continuous polymerization process without requiring extensive purification of recycled polymerization solvents.

A new and improved process for the recovery of alpha-olefin polymers from hydrocarbon solvent solutions has now been discovered. It has been discovered that when low boiling normally gaseous $C_3$-$C_4$ hydrocarbons are added to a polymer-solvent cement and the resulting solution is subject to specific conditions of temperature and pressure, precipitation of the dissolved polymer is brought about thereby facilitating separation of the polymer from the bulk of the polymerization solvent and subsequently providing for substantially complete separation and recovery of the polymer from the polymerization solvent.

As disclosed above the polymers most suitable for the present invention are synthesized by low pressure-low temperature methods. Also as indicated it is preferable to carry out the polymerization in a solvent in which the polymer is substantially completely soluble. This invention is particularly valuable in recovering such polymers from such solvents.

The materials to which this invention is particularly applicable are polymers of alpha-olefins and diolefins containing 2–22 carbon atoms. The monoolefin, which must be terminally unsaturated, preferably has a straight chain of 2 to 18 carbon atoms and thus can be ethylene, propylene, butene-1, pentene-1, hexene-1, and up to octadecene-1. The diolefin can contain 5 to 22 carbon atoms in either a straight or branched chain. Examples of suitable diolefins in which both double bonds are terminal are 1,4-pentadiene; 1,5-hexadiene (biallyl); 2-methyl-1,5-hexadiene; 3,3-di-methyl-1,5-hexadiene; 1,7-octadiene; 1,9-decadiene; 1,19-octadiene; and others. Also included as monomers are cyclic diolefins such as dicyclopentadiene.

In the actual polymerization process of the polymer product, at least two different monomers, and preferably three or more different olefin monomers, are fed to the reaction vessel. The polymerization method often comprises the addition of two different monoolefinic monomers and one diolefinic monomer in ratios which will yield a polymer product, the majority of which is alpha-olefin polymer, with a small quantity of diolefins randomly dispersed within the polymer chain to enhance curing properties.

As previously indicated the solvents especially useful in polymerizing the olefins are hydrocarbons and chlorinated hydrocarbons. These solvents or diluents include chlorinated and unchlorinated aromatics, paraffins and naphthenes including $C_5$ to $C_{12}$ paraffins, napththenes and aromatics. The preferred solvents are hexane, heptane, cyclohexane, methylcyclohexane, benzene, toluene, tetrachloroethylene, carbon tetrachloride, chlorobenzene, and di-chlorobenzene. In general any aromatic, paraffin or naphthenic hydrocarbon or chlorinated hydrocarbon which is a solvent for the polymer at a temperature in the polymerization range is suitable.

The hydrocarbons usable to bring about precipitation of the alpha-olefin polymer from the cement solution in the process of the present invention are $C_3$ and $C_4$ saturated and olefinically unsaturated hydrocarbons, namely, propane, propene, n-butane, isobutane, butene-1, and butene-2, butadiene and mixtures thereof. It is essential that the $C_3$ or $C_4$ hydrocarbon introduced as an antisolvent into the polymer-solvent cement be maintained for the most part in the liquid phase. Alpha-olefins generally soluble in the above-disclosed hydrocarbon polymerization solvents are under certain conditions soluble in $C_3$ and $C_4$ hydrocarbons also. However, it has been discovered that when the volume ratio of $C_3$ or $C_4$ hydrocarbon is maintained in a range of specific ratios to the polymerization solvent in a polymer-solvent cement, and the temperature and pressure of the entire solution is adjusted to specific ranges, the alpha-olefin polymer can be precipitated from the solution and subsequently recovered substantially solvent-free.

The maxium temperature at which the process of the present invention is operable is the pseudo critical temperature of the mixture of the polymerization solvent and particular $C_3$ or $C_4$ hydrocarbon or hydrocarbons used to precipitate the polymer, so that the mixture can be maintained in liquid phase. The minimum temperature at which the polymer can be precipitated from the cement solution will vary according to the specific polymerization solvent and the anti-solvent used as well as to the volume ratio of anti-solvent to solvent. Generally, this minimum temperature range falls in the range of 35° F. to 65° F.

The pressure within the separation vessel will vary according to the temperature and liquids used therein. However, as previously stated the internal pressure provided must be sufficient to maintain a substantial portion of the anti-solvent hydrocarbon in the liquid phase. The ratio of anti-solvent to solvent can be in the range of 1:10 to 10:1. The preferred range of anti-solvent to solvent is 1:4 to 4:1.

The efficiency of operation of the process of the present invention can be directly related to the variations in the particular set of conditions used. For example, a cement solution of 5 weight percent ethylene-propylene-dicyclopentadiene terpolymer in benzene can be treated by the following methods to recover the solid polymer; addition of 60 volume percent of propylene to the polymer-solvent solution at 350 p.s.i.g. pressure and at a temperature of 350° F. causes colloidal formation of the solid polymer which polymer then slowly precipitates from solution and can be recovered. However, if the temperature of the same mixture is raised to 140° F. solid polymer precipitation occurs at a much faster rate. The rate of precipitation of the solid polymer from the mixture of polymerization solvent and anti-solvent can be regulated by varying temperature of the mixture and also the solvent to anti-solvent ratio in the mixture.

A particularly useful temperature range for the process of the present invention is 35°–350° F. The prefered temperature range is 65°–250° F.

A more complete understanding of the invention will be obtained from a consideration of the accompanying drawing which is a diagrammatic flow plan of the process of the invention.

Referring to the drawing a solution of alpha-olefin polymer in solvent in which the catalyst has been deactivated is transferred from polymerization vessel 12 via line 13 into solvent polymer knockout column 14 wherein at a temperature of at least 35° F. the solution is contacted with a $C_3$–$C_4$ hydrocarbon anti-solvent introduced as a liquid into vessel 14 via line 26.

The solid polymer knockout column of the present process can comprise one or more single stage contactors such as a pressure tank equipped with a stirring device. However, it is preferred that a countercurrent contacting device such as a column be utilized. In this type of equipment the polymer dissolved in the polymerization solvent is subjected to countercurrent contacting with the hydrocarbon anti-solvent in the major part of the column. This is accomplished by introducing the polymer-solvent solution into the upper part of the column and at the same time introducing the anti-solvent into the lower part of the column. The precipitated solid polymer in a slurry with the anti-solvent liquid and containing small residual amounts of the polymerization solvent is subsequently withdrawn from the column via line 15 and transferred through pump 32 into polymer drying vessel 16. Polymer drying vessel 16 can be a heated rotating drum or a fixed column having internal means of agitation, and is maintained at atmospheric or subatmospheric pressure whereby the small quantities of residual solvent and anti-solvent in the precipitated polymer feed are flashed overhead and withdrawn through line 18, compressed to liquid phase again in compressor 33 and transferred to anti-solvent recovery column 20 via line 34. The substantially solvent-free dry polymer is recovered from dryer 16 by way of line 17. At the same time the mixture of the anti-solvent hydrocarbon and the polymerization solvent now substantially depleted of solid polymer is withdrawn from polymer knockout column 14 through line 19 and fed to column 20. The low boiling anti-solvent is flashed off in column 20 and is withdrawn through line 22 into compressor 23 wherein the anti-solvent is liquefied and can be recycled to column 14 via lines 25 and 26, or returned to polymerization vessel 12 or to storage facilities not shown. Fresh anti-solvent is added to the recycle stream of line 25 as needed via line 27 into line 26. The bottoms of column 20 are comprised primarily of polymerization solvent and small amounts of anti-solvent and polymer oil. The bottoms of column 20 are transferred to column 30 by way of line 21. Column 30 can be a simple fractionating column wherein the polymerization solvent and small amounts of anti-solvent are recovered in the overhead stream of the column which stream can be condensed and recycled to polymerization vessel 12 or to solvent storage facilities not shown via line 31. The bottoms of column 30 comprising primarily high boiling polymer oil is recovered by withdrawal through line 35.

Columns 20 and 30 and dryer 16 are normally maintained at pressures sufficient to facilitate easy recovery of the volatile liquids. Column 20 is normally maintained at a temperature below the boiling point of the polymerization solvent and above the boiling point of the $C_3$–$C_4$ anti-solvent to facilitate easier recovery of the anti-solvent fraction of the mixture therein.

Vessels 16 and 30 are normally maintained at a temperature above the boiling point of the polymerization solvent to facilitate easy recovery of the solvent plus the anti-solvent fractions. For most efficient operation columns 14, 20, and 30 can be steam jacketed autoclave type apparatus. In the operation of the process column 14 is maintained at the temperature most favorable for polymer precipitation utilizing the particular solvent-antisolvent combination selected. The pressure of column 14 is the selected pressure which will insure that the anti-solvent will be maintained substantially in the liquid phase.

For purpose of illustration, the following example is given as a specific embodiment of the process of the present invention.

A fifty gallon stirred autoclave was charged with 25 gallons of purified and dried toluene to which had been added 0.11 pound of a catalyst complex comprising $VOCl_3$ and diisobutyl aluminum chloride in the molar ratio of 10 moles of aluminum to 1 mole of vanadium. Also charged with the solvent to the autoclave is 1.2 pounds of dicyclopentadiene. While the contents of the autoclave were maintained in a state of agitation by means of an internal mixer, the autoclave was simultaneously heated to a temperature of 90° F. and pressured to a pressure of 35 p.s.i.g. with propylene. Then a mixture of ethylene and propylene in the ratio of 8 moles of propylene to 1 mole of ethylene was continuously fed to the reaction vessel to maintain 35 lbs. p.s.i.g. The autoclave was maintained at that pressure by feeding of the above monomers until the polymerization reaction was essentially complete, which required 3 hours and 35 minutes. The total amount of monomer fed to the reactor in this time was 28.6 lbs. of propylene and 2.7 lbs. of ethylene and 1.2 pounds of dicyclopentadiene. The reaction was then killed by the addition of a small amount of methanol.

A solution of about 5 weight percent ethylene-propylene copolymer in toluene solution was recovered and divided into two equal parts, A and B.

A solid polymer fraction was recovered from the solvent solution designated as part A by the standard methanol coagulation process which briefly comprises the addition of an equal volume of methanol to the polymer solvent solution which thereby resulted in precipitation of the polymer which was subsequently recovered from the liquid solvents by filtration and drying.

The solid polymer was recovered from the second half of the solution (part B) by adding to a closed autoclave the polymer-solvent solution and liquid propylene in the amount of four times the volume of the solvent in the polymer-solvent solution. The temperature of the charged autoclave was raised to 150° F. and the internal pressure of the autoclave was maintained in the range of 350–375 p.s.i.g., thereby resulting in precipitation of the polymer from solution. The precipitated polymer was withdrawn from the autoclave and dried by flash evaporation. Both samples of solid polymer recovered from solutions A and B were processed and cured according to well known standard procedures. There were substantially no differences in physical properties or appearance between the two polymer products.

We claim:

1. A process for recovering a solid alpha-olefin polymer from a polymerization solvent solution thereof which comprises contacting said solution with a liquid hydrocarbon antisolvent selected from the group consisting of saturated and unsaturated $C_3$ and $C_4$ hydrocarbons, at a pressure sufficient to maintain the resulting mixture in liquid phase and at a temperature of at least 35° F., thereby resulting in precipitation of solid polymer from solution, and thereafter separating the precipitated polymer from the solvent anti-solvent mixture.

2. A process according to claim 1 wherein the polymerization solvent comprises one or more solvents selected from the group consisting of paraffins, aromatics, naphthenes, and chlorinated derivatives thereof.

3. A process according to claim 1 wherein the temperature is in the range of 35°–350° F.

4. A process according to claim 2 wherein the temperature is in the range of 35°–350° F.

5. A process according to claim 1 wherein the temperature is in the range of 65°–250° F.

6. A process according to claim 2 wherein the temperature is in the range of 65°–250° F.

References Cited

UNITED STATES PATENTS

| | | | |
|---|---|---|---|
| 2,837,504 | 6/1958 | Hanson et al. | 260—94.9 |
| 2,870,113 | 1/1959 | Jones | 260—94.9 |
| 3,076,795 | 2/1963 | Hall | 260—94.7 |

JOSEPH L. SCHOFER, *Primary Examiner.*

L. EDELMAN, *Assistant Examiner.*

U.S. Cl. X.R.

260—93.1, 94.7, 94.9, 88.2

PO-1050
(5/69)

UNITED STATES PATENT OFFICE
CERTIFICATE OF CORRECTION

Patent No. 3,431,249            Dated     3/4/69

Inventor(s)    Byron B. Bohrer and Stewart S. Kurtz, Jr.

It is certified that error appears in the above-identified patent and that said Letters Patent are hereby corrected as shown below:

Column 3, line 64, "350° F." should be -- 35° F. --.

Column 5, line 29, "sol" should be -- sol- --.

SIGNED AND
SEALED

AUG 26 1969

(SEAL)
Attest:

Edward M. Fletcher, Jr.
Attesting Officer

WILLIAM E. SCHUYLER, JR.
Commissioner of Patents